June 15, 1965  J. W. BATCHELDER  3,189,157
PARTS-PACKAGING MACHINE
Filed July 25, 1962  4 Sheets-Sheet 1
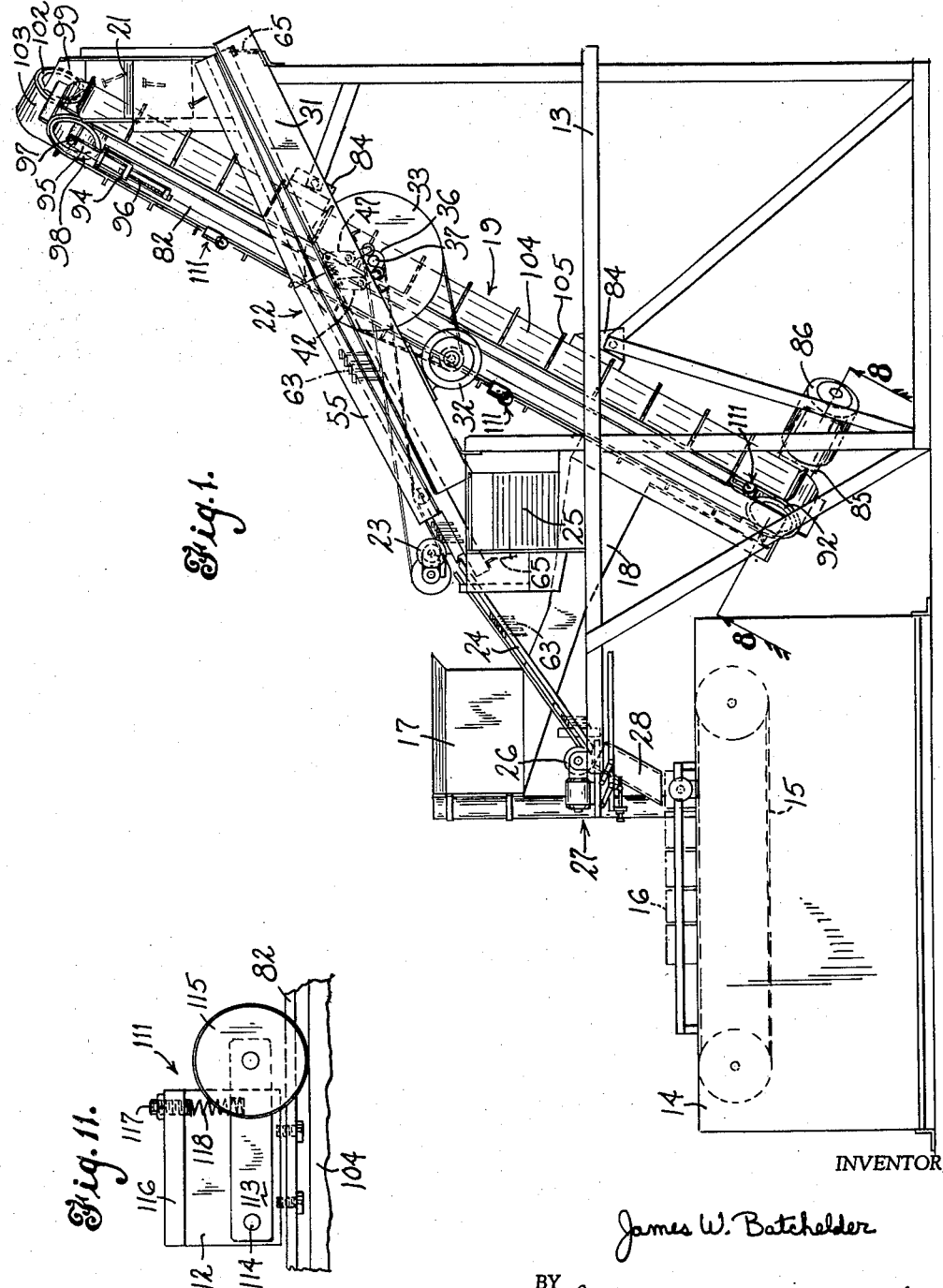
INVENTOR
James W. Batchelder
BY Spencer, Rockwell & Bartholow
ATTORNEY

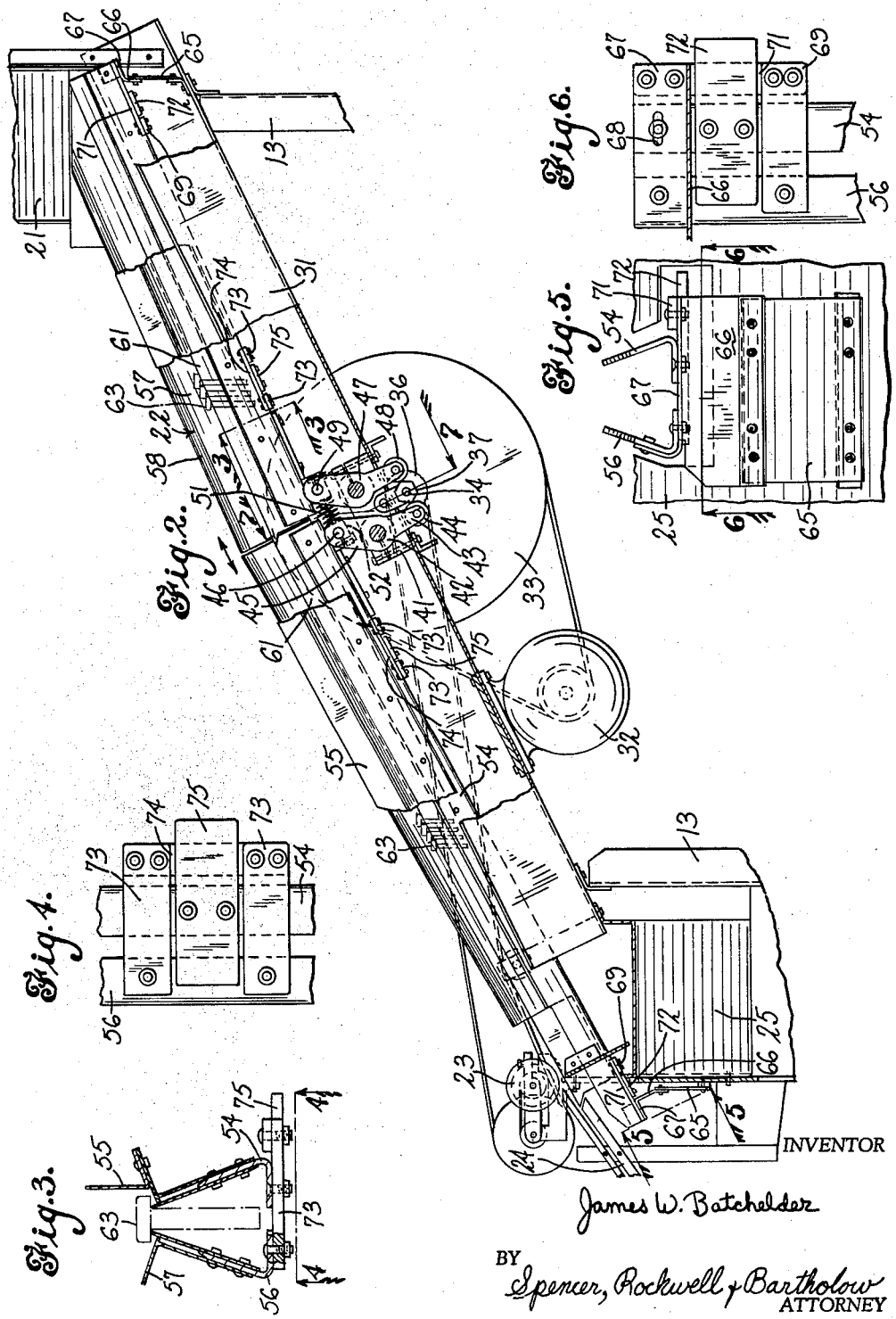

June 15, 1965   J. W. BATCHELDER   3,189,157
PARTS-PACKAGING MACHINE
Filed July 25, 1962   4 Sheets-Sheet 3
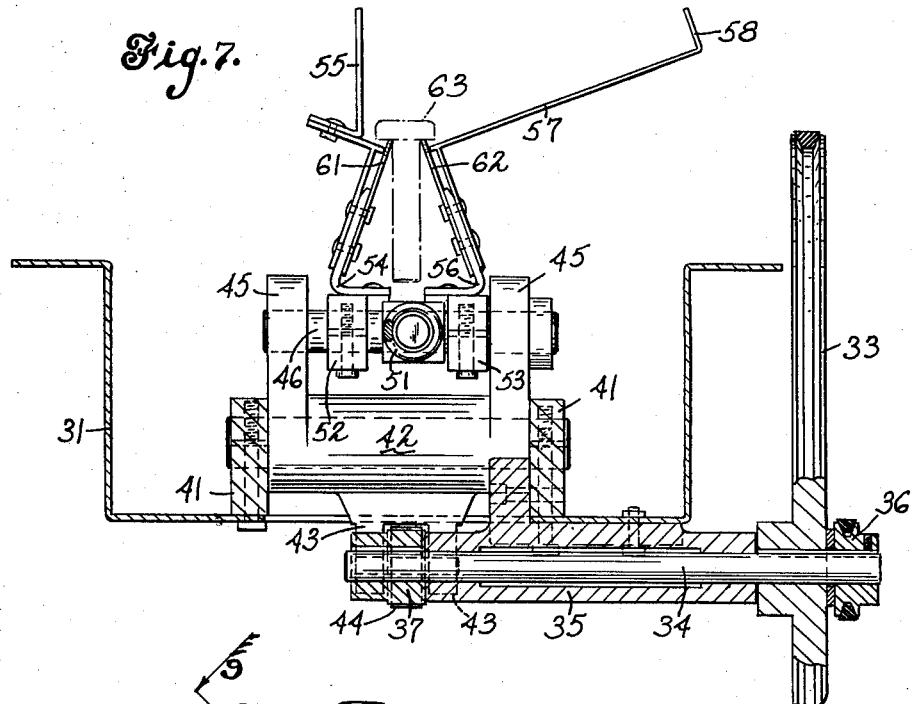
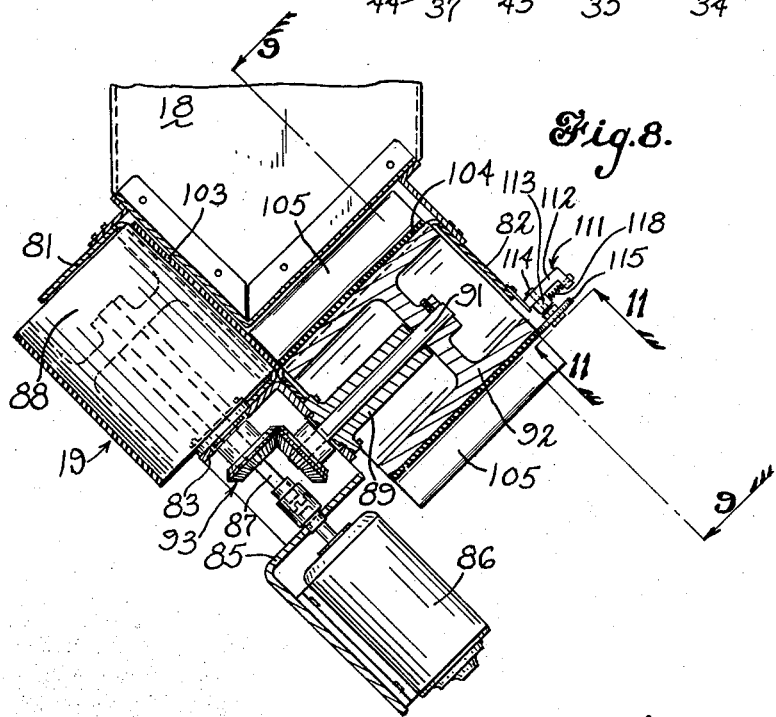
INVENTOR
James W. Batchelder
BY Spencer, Rockwell & Bartholow
ATTORNEY June 15, 1965  J. W. BATCHELDER  3,189,157
PARTS-PACKAGING MACHINE
Filed July 25, 1962  4 Sheets-Sheet 4
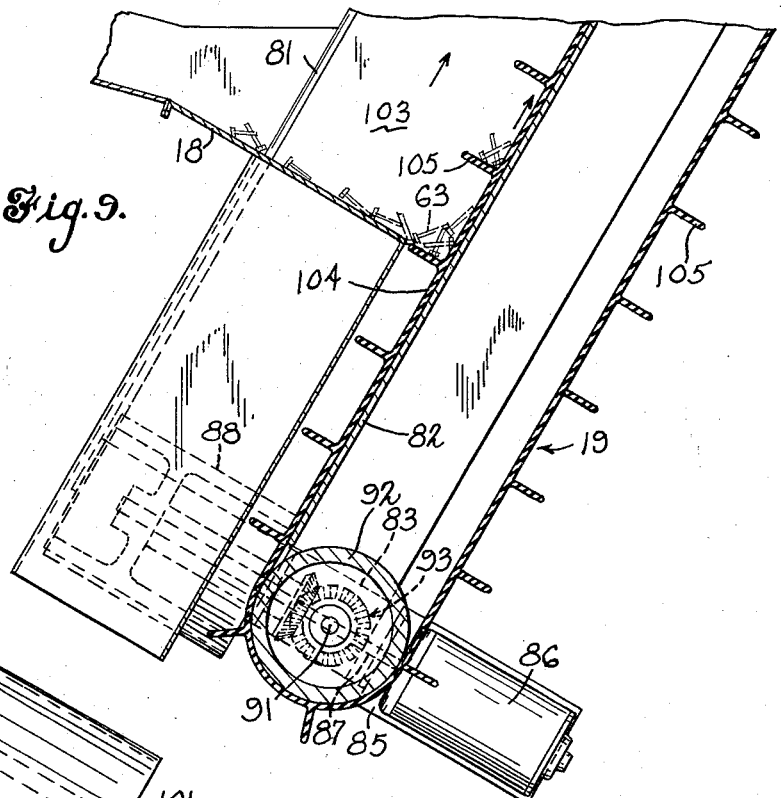
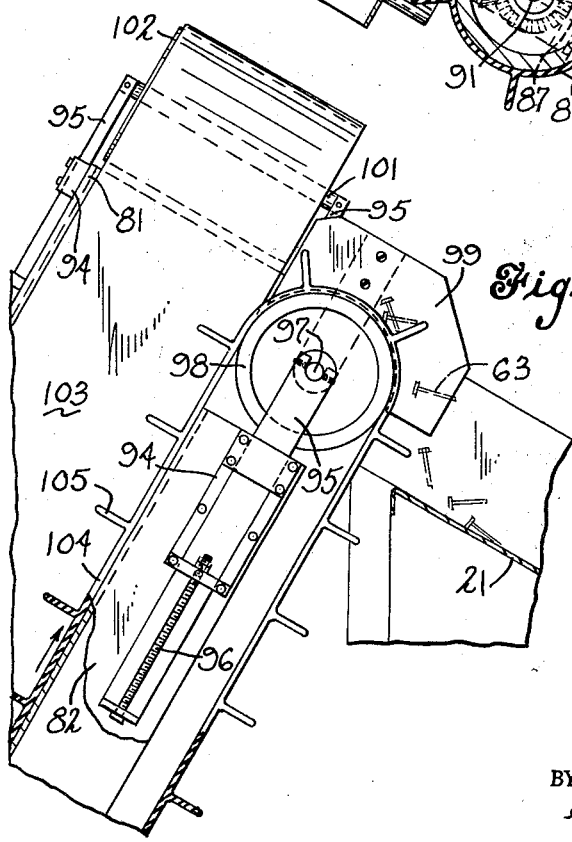
INVENTOR
James W. Batchelder
BY
Spencer, Rockwell & Bartholow
ATTORNEY

United States Patent Office 3,189,157
Patented June 15, 1965

3,189,157
PARTS-PACKAGING MACHINE
James W. Batchelder, Chester, Vt., assignor to Textron Inc., Providence, R.I., a corporation of Rhode Island
Filed July 25, 1962, Ser. No. 212,220
14 Claims. (Cl. 198—33)

This invention relates to a parts-packaging machine, and more particularly to certain improvements for such machines. Specifically, the invention relates to an improved elevator feeder for feeding randomly oriented parts such as screws, nails or like articles to a track wherein the parts are oriented for counting and delivery to boxes or packages, and improved means for vibrating the track to effect the proper orientation of the parts. The improved feeder and vibrating means may also be used to orient the parts for delivery to machines or stations which perform further operations on them.

Machines of this general type are usually provided with a hopper into which large quantities of randomly oriented parts are dumped. The parts are then picked up, a few at a time, and delivered to a vibrating device which causes them to be vibrated into guides, thereby orienting the parts as desired. An example of a combined hopper and feeder and a vibrating track is shown in U.S. Patent No. 2,825,489, issued on March 4, 1958. While the mechanisms shown therein are fully operable to perform the desired operations, they are limited in the quantity of parts that can be fed and oriented in a given time. Since it is economically desirable to package or feed the parts at increased rates, the invention herein combines features which make an increased rate possible.

Accordingly, it is an object of this invention to provide an improved parts-packaging machine.

Another object of the invention is to provide a parts-orienting machine with improved means for vibrating the parts into an oriented position.

Still another object of the invention is to provide an improved feeder capable of delivering a large quantity of parts to a receiving station.

A further object of the invention is to provide a parts-packaging machine having improved feeder and vibrating means capable of increasing the packaging rate of the machine.

Another object of the invention is to provide means for vibrating parts which will not cause undue vibration of the machine supporting the vibrating means.

Still other objects and advantages of the invention will in part be obvious and will in part be apparent from the specification.

Generally speaking, in accordance with this invention, parts are picked up by an elevator feeder from a hopper and dumped, through a chute, onto a vibrating track. The elevator feeder is provided with two belts to assure positive transporting of the maximum number of parts. The vibrating track is divided into two portions which are concurrently vibrated in opposed directions so that the effective vibration on the machine supports and frame are nullified. The vibration of the track causes the parts to be oriented in the track so that the parts are in a position to be counted and thereafter delivered, in preselected quantities, to a box or other package.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawings, in which:

FIG. 1 is a side elevational view of the machine embodying the improved feeder and vibrating track;

FIG. 2 is a partial elevational view on a larger scale of the vibrating track portion of the machine shown in FIG. 1;

FIG. 3 is a partial sectional view of the track taken along line 3—3 of FIG. 2;

FIG. 4 is a partial view of the elements of FIG. 3 viewed from the direction shown by the arrows 4—4 in FIG. 3;

FIG. 5 is a partial sectional view of the track taken along line 5—5 of FIG. 2;

FIG. 6 is a partial sectional view taken along line 6—6 of FIG. 5;

FIG. 7 is a partial sectional view of the track taken along line 7—7 of FIG. 2;

FIG. 8 is a partial sectional view of the feeder drive taken along line 8—8 of FIG. 1;

FIG. 9 is a partial sectional view of the lower portion of the elevator feeder taken along line 9—9 of FIG. 8;

FIG. 10 is a partial sectional view similar to FIG. 9 but showing the upper portion of the elevator feeder; and FIG. 11 is a partial sectional view taken along line 11—11 of FIG. 8.

Referring now to FIG. 1, the mechanism to be described herein is mounted on a frame 13 positioned adjacent a table 14. The table is provided with a conveyor 15 or other suitable means for carrying boxes or packages 16 to the filling station where each one is to be filled with a preselected number of parts. The cycle of parts flow is as follows: The parts are dumped into a hopper 17 and flow down through a chute 18 to the elevator feeder shown generally at 19. The elevator feeder raises the parts and dumps them into an upper chute 21 which feeds them by gravity to an upper vibrating track, shown generally at 22. The parts are oriented in the upper track and pass beneath a kicker wheel 23 to a lower track 24. Kicker wheel 23 prevents nonoriented parts from passing down to lower track 24. The operation of the kicker wheel is more fully described in aforementioned Patent 2,825,489, with particular reference to FIG. 16 and the appropriate description of the ejector mechanism in column 5 of the specification. All the parts dumped on upper vibrating track 22 which are not properly oriented so as to pass beneath kicker wheel 23 and enter lower track 24, enter an overflow chute 25 which leads into chute 18. The parts that flow down lower track 24 pass beneath a control wheel 26 forming part of the counting mechanism, shown generally at 27. A counting mechanism such as is the subject of Patent 2,907,154 may be used to count the parts and control their flow as they are delivered in preselected quantities through delivery tube 28 to the boxes. Since the kicker wheel mechanism and counting mechanism are deemed to form no part of the invention herein, further description is considered to be unnecessary since adequate disclosure of such mechanisms may be had by reference to the above-cited patents.

The construction of the upper vibrating track, shown generally at 22 in FIG. 1, is shown with greater particularity in FIGS. 2 through 7. Referring especially to FIGS. 2 and 7, a support plate 31 is supported by frame 13 and carries a motor 32 which drives a pulley 33 by means of a suitable flexible belt. Pulley 33 is mounted on a shaft 34 which is rotatably journaled in a tube 35 mounted to the under side of support plate 31. A pulley 36 is also mounted on shaft 34 and effects the driving of kicker wheel 23 by means of a suitable flexible belt. Shaft 34 also carries a cam 37 provided with an even number of flats equally spaced around the surface of the cam. For the purposes of illustration, a cam having six flats is shown in FIG. 2, it being understood that a cam having any even number of flats may be provided.

A pair of spaced blocks 41 are secured to the inner surface of support plate 31 and rotatably support a bell crank 42. The lower end of bell crank 42 is provided with spaced fingers 43 between which is journaled a cam follower 44. The upper end of bell crank 42 is provided with spaced fingers 45 between which is journaled a shaft 46. A second bell crank 47, identical in all respects to bell crank 42, is also rotatably journaled between blocks 41. The lower end of bell crank 47 carries a cam follower 48 while the upper end carries a shaft 49. A compression spring 51 is mounted between shafts 46 and 49 to yieldably urge the shafts apart, thereby urging cam followers 44 and 48 into contact with the surface of cam 37.

The vibrating track is formed in two substantially identical sections which may be termed, for convenience of illustration, the left section and the right section, as seen in FIG. 2. The vibration of the left section is effected by bell crank 42, while the vibration of the right section is effected by bell crank 47. Since the left and right trackways are constructed, supported and vibrated identically, the construction and relationship of elements will be described for one trackway only.

Referring again particularly to FIGS. 2 and 7, two blocks 52 and 53 are mounted on journaled shaft 46. Block 53 is fast to shaft 46, while block 52 may be slid along shaft 46 and secured in any adjusted position, thereby providing means for effecting the adjustment of the track spacing at one end of the left trackway. An angle support 54 extends the entire length of the left trackway, and is secured at one end to block 52. A deflector shield 55 is secured to angle support 54. An angle support 56 is secured to block 53 and has secured thereto a table 57 having an upturned outer end 58. Also secured to angle support 54 is an adjustable knife support 61, while a knife support 62 is secured to angle support 56. The spacing between the upper edges of adjustable knife support 61 and knife support 62 determines the track width, which is set by adjusting the position of adjustable knife support 61 through slidable block 52. The spacing is selected to freely accommodate the shank of the part being packaged, while blocking passage of the head of the part so that the part, shown in phantom as 63, will be oriented to the position shown in FIG. 7. It will be seen that the upper edge of knife supports 61 and 62 must extend sufficiently far above blocks 52 and 53 to provide shank clearance for the longest part 63 to be accommodated by the machine.

Referring now to FIGS. 2, 5 and 6, the other end of the trackways are reed mounted so that they may be vibrated as will be hereafter described. In the case of the left trackway, a reed 65 is mounted at one end to a side wall or support member of overflow chute 25. In the case of the right trackway, reed 65 is mounted at one end to frame 13 through trough 31. Mounted to the other end of reed 65 is a leg 66 having a flanged end 67. Secured to the flanged end 67 are angle supports 56 and 54. Flanged end 67 is provided with an elongated slot 68 so that the position of angle support 54 may be adjusted with respect to flanged end 67, thereby providing further means for adjusting the spacing between knife supports 61 and 62. The location of the reeds is such as to provide a downward slope of the trackways. The preferred slope is 20°–30° from horizontal, but the slope is not limited within such range so long as the slope is sufficient to provide gravity feed.

Means are also provided for maintaining the parallelism of knife supports 61 and 62. Referring particularly to FIGS. 5 and 6, flanged end 67 extends perpendicularly from angle support 56 and projects beyond and underlies angle support 54. A plate 69 is attached perpendicularly to angle support 56 and projects beyond and underlies angle support 54. A plate 71 is secured at its ends to the projecting ends of flanged end 67 and plate 69, plate 71 extending parallel to angle support 56. An arm 72 is secured intermediate its ends in perpendicular relationship to angle support 54. Arm 72 underlies both angle support 56 and plate 71. It will thus be seen that upward movement of angle support 54 with relation to angle support 56 is prevented by arm 72, while downward movement of angle support 54 with relation to angle support 56 is prevent by flanged end 67 and plate 69. Both the right and left trackways are provided with such means for maintaining parallelism adjacent the reed mountings.

Similar means for maintaining parallelism are also provided along the trackways near the bell crank supports. Such means are more clearly shown in FIGS. 3 and 4. A pair of plates 73 are attached in spaced parallel relationship perpendicular to angle support 56. A plate 74 interconnects the two plates 73. An arm 75 is attached intermediate its ends to angle support 54, the arm extending parallel to plates 73. As will be seen in FIG. 4, plates 73 underlie angle support 54, while arm 75 underlies both angle support 56 and plate 74. It will be evident that these elements maintain parallelism of the two angle supports in a manner similar to that heretofore described with reference to FIG. 6.

In operation, parts are dumped from elevator feeder 19 into upper chute 21 and onto the upper end of table 57 of the right trackway. Since table 57 slopes toward the trackway opening and also slopes downwardly toward the kicker wheel, the parts will tend to slide in toward the trackway opening. Deflector shield 55 keeps the parts in the area of the trackway opening. As the parts are dumped onto table 57, motor 32 is operated, thereby rotating cam 37. Since spring 51 urges cam followers 44 and 48 into contact with the surface of cam 37, the rotation of the cam will cause cranks 42 and 47 to be moved through small arcs in the clockwise and counterclockwise direction about their pivotal mountings in blocks 41. Cam 37 is provided with an even number of flats spaced equally around the surface of the cam, so that the arcuate movement of bell crank 42 will be precisely opposite to the arcuate movement of bell crank 47 at any given instant of time. In other words, when bell crank 42 is moving in the clockwise direction, bell crank 47 will be moving in the counterclockwise direction, and vice versa. The angle supports of the right trackway are mounted on bell crank 47 through shaft 49, and the angle supports of the left trackway are mounted on bell crank 42 on shaft 46. As the bell cranks move through their arcuate path, opposed linear motion is imparted to the angle supports of the left and right trackways. Back and forth movement of each of the trackways is permitted since the outer ends of each trackway are mounted to the frame or other stationary member of the machine through flexible reeds 65. In this manner, the trackways are vibrated in opposed directions, thereby reducing or negating the amount of vibration imparted to the frame of the machine. The angle supports are maintained in parallel relationship by means of the elements shown in FIGS. 4 and 6, and the spacing of knife supports 61 and 62 may be adjusted independent of the vibrating mechanism, the reed mountings, and the elements for maintaining parallelism.

As the parts on table 57 travel toward kicker wheel 23 by means of gravity, they are vibrated in the manner heretofore described, and the shafts of some of them will fall between knife supports 61 and 62, thereby orienting them in the head-up position, as shown in phantom in FIG. 7. A sufficient number of parts will be dumped onto table 57 to permit the trackway to be filled so that packaging may be continuous. As the parts leave the left trackway, they pass beneath notched kicker wheel 23, which kicks out any parts not properly oriented. Thereafter the parts slide by gravity down lower track 24, beneath control wheel 26, through delivery tube 28, and into box 16. Any parts on table 57 which do not orient themselves between knife supports 61 and 62 and any parts which are vibrated over onto support plate 31 will slide by gravity into overflow chute 25, which will deliver them back to chute 18, to be again raised by the elevator feeder.

The elevator feeder, shown generally at 19 in FIG. 1, is shown in greater detail in FIGS. 8 through 11. Two structural channel members 81 and 82, extending substantially the entire length of the feeder, are secured together in perpendicular relationship by an L-shaped member 83. The members are supported by the machine frame through support plates 84. A motor bracket 85 is secured to L-shaped member 83 at the base of the feeder, and mounted thereon is a motor 86. The motor shaft 87 is journaled through motor bracket 85 and channel member 81, and has mounted thereon, between the legs of the channel member, a belt pulley 88. A journal tube 89 is secured to channel member 82, and journaled therethrough is a shaft 91. A belt pulley 92 is secured on shaft 91. Fast on shafts 87 and 91 is a set of bevel gears 93 in engaging relationship whereby the operation of motor 86 rotates motor shaft 87 and belt pulley 88 and, through the bevel gears 93, rotates shaft 91 and belt pulley 92.

Channel members 81 and 82 extend to the upper end of the elevator feeder, as may be seen in FIG. 10. The outer side of one leg of channel member 82 carries, at its upper end, a guide assembly 94 through which passes a slidable arm 95. The slidable arm and guide assembly are interconnected by an adjusting screw 96 which adjusts the extension of slidable arm 95 with relation to channel member 82. One end of a shaft 97 is mounted in slidable arm 95. The outer side of the opposite leg of channel member 82 carries a substantially similar guide assembly, slidable arm and adjusting screw, the slidable arm supporting the opposite end of shaft 97. Between the slidable arms on shaft 97 is rotatably mounted an idler belt pulley 98. The slidable arm mounted on the opposite leg of channel member 82 extends above idler belt pulley 98 and carries a deflector 99 adapted to deflect the parts as they are dumped into upper chute 21, as will hereafter be described.

The outer side of each leg of channel member 81 also carries guide assemblies, slidable arms and adjusting screws similar to those shown at 94, 95 and 96, respectively, and between the slidable arms is mounted a shaft 101 on which is rotatably mounted an idler belt pulley 102. An endless belt 103 passes over, is carried by and extends between belt pulley 88 and idler belt pulley 102. Endless belt 103 overlies the planar base section of channel member 81. An endless belt 104 passes over, is carried by and extends between belt pulley 92 and idler belt pulley 98, and overlies the planar base of channel member 82. Endless belt 104 is provided with a plurality of spaced upstanding legs 105 which extend the entire width of the endless belt. The inside edges of upstanding legs 105 overlie endless belt 103, as shown in FIG. 8. Chute 18 extends into the crotch formed between endless belt 103 and endless belt 104, and may be secured in that position by attachment to channel members 81 and 82.

The adjustable mountings for idler belt pulleys 98 and 102 are provided for adjusting the amount of tension placed on endless belts 104 and 103 respectively. Since the endless belts are driven frictionally by belt pulleys 92 and 88, sufficient tension must be placed on the endless belts to insure proper frictional engagement of the endless belts with the drive pulleys. Furthermore, endless belts of a flexible material have a tendency to stretch and the adjustment permits the tension to be adjusted from time to time.

A plurality of idlers, shown generally at 111, are mounted to the legs of channel members 81 and 82 along the length thereof, and are provided with idler wheels 115 which engage the edges of endless belts 103 and 104 to maintain the alignment of the endless belts during their continuous travel. An idler 111 is shown in greater detail in FIG. 11. A support 112 is mounted to the outer side of a leg of one of the channel members, shown as channel member 82 by way of example. One end of a pressure arm 113 is pivoted at 114 to support 112. The other end of pressure arm 113 carries a rotatably mounted idler wheel 115 adapted to contact the edge of the endless belt. Support 112 is provided with an extending leg 116 in which is threadedly engaged an adjusting screw 117. Mounted between adjusting screw 117 and pressure arm 113 is a spring 118 which urges idler wheel 115 into contact with the edge of the endless belt. The pressure exerted by idler wheel 115 may be adjusted by means of adjusting screw 117.

The operation of the elevator feeder may be described as follows: Parts are dumped into hopper 17 and, by gravity, slide down chute 18 into the crotch between each endless belt is tilted toward the crotch, as shown in FIG. 8, and rearwardly, as shown in FIG. 1, the parts will fall by gravity against both belts, as shown in FIG. 9. The upstanding legs 105 on endless belt 104 will pick up some of the parts and transport them to the top of the elevator feeder. The concurrent movement of endless belt 103 in the same direction will prevent the parts from being dragged out of the pocket formed by upstanding leg 105. As endless belt 104 reaches idler belt pulley 98, the parts will be carried over the top of the idler belt pulley and allowed o fall on upper chute 21. The extension of endless belt 103 and deflector 99 above idler belt pulley 98 assures that the parts stay in the pocket formed by upstanding legs 105 until they are in a position to fall on upper chute 21. Thereafter, the parts will fall, by gravity, onto the vibrating track, as heretofore described.

It will thus be seen that the objects set forth above, among those made apparent from the preceding description, are efficiently attained and, since certain changes may be made in the above construction without departing from the spirit and scope of the invention, it is intended tha tall matter contained in the above description or shown in the accompanying drawings shall be interpreted as illustrative and not in a limiting sense.

What is claimed is:

1. In a machine for effecting the orientation of parts supplied to a hopper in bulk, random form, the combination of a hopper, a feeder, an inclined chute adapted to deliver, by gravity, parts from said hopper to the base of said feeder, a vibrating mechanism, said feeder adapted to raise the parts from its base to said vibrating mechanism, said vibrating mechanism adapted to orient the parts to facilitate counting and packaging of the parts, and an overflow chute for unoriented parts connected between said vibrating mechanism and said inclined chute, said feeder comprising a first channel member mounted to said frame, a second channel member mounted to said frame, each channel member having a planar surface and a longitudinal axis, said longitudinal axes being parallel to one another and said planar surfaces being perpendicular to one another with the longitudinal edge of one surface adjacent the longitudinal edge of the other surface, a first pair of spaced parallel pulleys rotatably mounted at opposite ends of said first channel member, a second pair of spaced parallel pulleys rotatably mounted at opposite ends of said second channel member, the axis of each pulley being parallel to the plane of the planar surface of the channel member on which it is mounted, first power-operated means for driving one pulley of each of said first and second pairs, a first endless belt overlying the planar surface of said first channel member and frictionally engaged over and extending between said first pair of pulleys, said first endless belt including a plurality of upstanding legs extending perpendicularly from the surface of said first endless belt and parallel to the axes of said first parallel pulleys, said upstanding legs being spaced along the outer surface of said belt, and a second endless belt overlying the planar surface of said second channel member and engaged over and extending between said second pair of pulleys, said planar surfaces sloping upwardly and rearwardly so that parts fed from the hopper to the overlying portions of said endless belts will fall, by way of gravity, toward the adjacent longitudinal edges of said planar surfaces, whereby parts fed to a lower portion of said feeder will be raised up and dropped onto said vibrating mechanism, said vibrating mechanism comprising a support plate mounted to said frame, a pair of axially aligned trackways positioned above said support plate, a pair of planar reeds, one mounted between the outer end of each of said trackways and said frame, the plane of said reeds being perpendicular to a vertical plane through the axis of said aligned trackways, said reeds being secured to said frame to permit movement of said trackways toward and from one another and to prevent lateral movement, oscillating means mounted between said support plate and said trackways for supporting the other adjacent ends of said trackways and effecting axial movement of each trackway in a direction opposite to the movement of the other trackway at any given instant of time, and second power-operated means for effecting oscillation of said oscillating means, whereby the parts dropped onto said vibrating mechanism by said feeder are vibrated along said trackways into said trackways to orient the parts with respect to one another.

2. The structure defined in claim 1, wherein said oscillating means comprises a cam rotatably mounted to said drive for rotation by said power-operated means, and a pair of bell cranks each pivoted intermediate its ends to said support plate with the upper end of each bell crank pivotally attached to one of the adjacent ends of said trackways, and the other end of each bell crank adjacent the surface of said cam whereby rotation of said second power-operated means causes said bell cranks to be pivoted to effect axial movement of said trackways.

3. The structure defined in claim 1, and further including adjusting means mounted between one pulley of each pair and its adjacent channel member for adjusting the distance between the pulleys of each pair to adjust the tension on each endless belt.

4. The structure defined in claim 3, and further including a plurality of guide means mounted to said first and second channel members for engagement with the edges of said first and second endless belts to guide said endless belts as they move continuously over said first and second pulley pairs.

5. A vibrating mechanism for parts comprising a frame, a support plate mounted to said frame, a pair of axially aligned trackways positioned above said support plate, movable means mounted between the outer ends of said trackways and said frame for supporting one outer end of each trackway and permitting movement in the axial direction, oscillating means mounted between said support plate and said trackways for supporting the other adjacent ends of said trackways and effecting axial movement of each trackway in a direction opposite to the movement of the other trackway at any given instant of time, and power-operated means for effecting oscillation of said oscillating means, said oscillating means including a cam rotatably mounted to said support plate for rotation by said power-operated means.

6. A vibrating mechanism for parts comprising a frame, a support plate mounted to said frame, a pair of axially aligned trackways positioned above said support plate, a pair of planar reeds, one mounted between the outer end of each of said trackways and said frame, the plane of said reeds being perpendicular to a vertical plane through the axis of said aligned trackways, said reeds being secured to said frame to permit movement of said trackways toward and from one another and to prevent lateral movement, oscillating means mounted between said support plate and said trackways for supporting the other adjacent ends of said trackways and effecting axial movement of each trackway in a direction opposite to the movement of the other trackway at any given instant of time, and power-operated means for effecting oscillation of said oscillating means, said oscillating means including a cam rotatably mounted to said support plate for rotation by said power-operated means and a pair of cam followers supported by said support plate, one of said cam followers coupled to each of said trackways and actuated by said cam.

7. A vibrating mechanism for parts comprising a frame, a support plate mounted to said frame, a pair of axially aligned trackways positioned above said support plate, a pair of planar reeds, one mounted between the outer end of each of said trackways and said frame, the plane of said reeds being perpendicular to a vertical plane through the axis of said aligned trackways, said reeds being secured to said frame to permit movement of said trackways toward and from one another and to prevent lateral movement, oscillating means mounted between said support plate and said trackways for supporting the other adjacent ends of said trackways and effecting axial movement of each trackway in a direction opposite to the movement of the other trackway at any given instant of time, and power-operated means for effecting oscillation of said oscillating means, said oscillating means including a cam rotatably mounted to said support plate for rotation by said power-operated means.

8. The structure defined in claim 7, wherein the surface of said cam is provided with any even number of flats spaced equally around the periphery of said cam.

9. A vibrating mechanism for parts comprising a frame, a support plate mounted to said frame, a pair of axially aligned trackways positioned above said support plate, a pair of planar reeds, one mounted between the outer end of each of said trackways and said frame, the plane of said reeds being perpendicular to a vertical plane through the axis of said aligned trackways, said reeds being secured to said frame to permit movement of said trackways toward and from one another and to prevent lateral movement, a pair of bell cranks each pivoted intermediate its ends to said support plate with the upper end of each bellcrank pivotally attached to one of the adjacent ends of said trackways for supporting the ends of said trackways, a cam rotatably mounted to said support plate, said cam being disposed between and adjacent the lower ends of said bell cranks for oscillating said bell cranks to effect axial movement of each trackway in a direction opposite to the movement of the other trackway at any given instant of time, and power-operated means mounted to said support plate for rotating said cam.

10. The structure defined in claim 9, and further including a spring mounted between the ends of said bell cranks attached to said trackways and resiliently urging the lower ends of said bell crank into contact with the surfaces of said cam.

11. The structure defined in claim 10, and further including a cam follower rotatably mounted to the lower end of each bell crank, said cam followers being disposed on opposite sides of said cam, and a spring mounted between the ends of said bell crank supporting said trackways for urging said cam followers into contact with the surface of said cam.

12. The structure defined in claim 7, wherein each of said trackways includes a pair of spaced parallel knife supports adapted to have the parts guided therein and further includes means provided at each of the supports for said trackways for adjusting the spacing of said knife supports.

13. The structure defined in claim 12, and further including means for maintaining the parallelism of the knife supports of each trackway during operation of said oscillating means.

14. In a machine for effecting the orientation of parts supplied to a hopper in bulk, random form, the combination of a hopper, a feeder, an inclined chute adapted to deliver, by gravity, parts from said hopper to the base of said feeder, a vibrating mechanism, said feeder adapted to raise the parts from its base to said vibrating mechanism, said vibrating mechanism adapted to orient the parts to facilitate counting and packaging of the parts, an overflow chute for unoriented parts connected between said vibrating mechanism and said inclined chute, power-operated means for effecting vibration of said vibrating mechanism, said vibrating mechanism including a cam means mounted for rotation by said power-operated means.

References Cited by the Examiner

UNITED STATES PATENTS

| | | | |
|---|---|---|---|
| 215,322 | 5/79 | Colahan | 198—165 |
| 2,245,881 | 6/41 | Vissac. | |
| 2,653,702 | 9/53 | Linke. | |
| 2,761,543 | 9/56 | Brenneck. | |
| 2,764,351 | 9/56 | Broscomb. | |
| 2,825,489 | 3/58 | Batchelder | 221—160 |
| 2,945,335 | 7/60 | Nicolle | 221—156 X |
| 2,997,156 | 8/61 | Frazier | 198—165 |
| 3,068,991 | 12/62 | Prutton. | |

SAMUEL F. COLEMAN, *Primary Examiner.*

EDWARD A. SROKA, *Examiner.*

UNITED STATES PATENT OFFICE
CERTIFICATE OF CORRECTION

Patent No. 3,189,157                                                June 15, 1965

James W. Batchelder

It is hereby certified that error appears in the above numbered patent requiring correction and that the said Letters Patent should read as corrected below.

Column 6, line 10, after "between" insert -- endless belts 103 and 104. As the pick-up surface of --; line 21, for "o" read -- to --.

Signed and sealed this 23rd day of November 1965.

(SEAL)
Attest:

ERNEST W. SWIDER
Attesting Officer

EDWARD J. BRENNER
Commissioner of Patents